United States Patent [19]

Lopresti et al.

[11] Patent Number: 5,748,807
[45] Date of Patent: May 5, 1998

[54] METHOD AND MEANS FOR ENHANCING OPTICAL CHARACTER RECOGNITION OF PRINTED DOCUMENTS

[75] Inventors: Daniel P. Lopresti, Hopewell, N.J.; Jonathan S. Sandberg, New York, N.Y.

[73] Assignee: Panasonic Technologies, Inc., Princeton, N.J.

[21] Appl. No.: 138,467

[22] Filed: Oct. 15, 1993

Related U.S. Application Data

[63] Continuation-in-part of Ser. No. 958,938, Oct. 9, 1992, abandoned.

[51] Int. Cl.[6] .................................................. G06K 9/03
[52] U.S. Cl. .................................. 382/310; 382/311
[58] Field of Search .................. 382/57, 61, 309–311, 382/312, 317; 358/403, 405; 364/737; 371/53, 52, 57.2

[56] References Cited

U.S. PATENT DOCUMENTS

| | | | |
|---|---|---|---|
| 3,713,097 | 1/1973 | Linnerooth et al. | 382/57 |
| 4,013,997 | 3/1977 | Treadwell III | 371/37.1 |
| 4,105,997 | 8/1978 | McGinn | 382/57 |
| 4,325,117 | 4/1982 | Parmet et al. | 371/53 |
| 4,608,692 | 8/1986 | Nagumo et al. | 371/37 |
| 4,866,666 | 9/1989 | Francisco | 371/53 |
| 5,070,504 | 12/1991 | Bossen et al. | 371/54 |

*Primary Examiner*—Joseph Mancuso
*Attorney, Agent, or Firm*—Amster Rothstein Ebenstein

[57] ABSTRACT

A document marker, including first values dependent upon the layout and the contents of the document and assigned by generating or preprocessing software, is provided in machine-readable symbology on the face of a printed version of the document. The marker may include encoded document layout information and values assigned on sequences of the original text, including text-dependent decimation sequences, error correction codes or checksums. Upon optical character recognition scanning, or other digitizing reproduction, the marker is also scanned. The scanning computer, having corresponding software, assigns second values dependent upon the layout and contents of the reproduced document. Upon comparison of the first and second decimation sequences, line and character errors can be detected and some errors corrected, thereby generating re-aligned candidate sequences. Optional error correction codes can provide further correcting capabilities, as applied to the re-aligned reproduced document sequences; and, an optional check-sum comparison can be utilized to verify the accuracy of the reproduced sequences are correct.

14 Claims, 9 Drawing Sheets

FIG.5A FIG.5B FIG.5C FIG.5D FIG.5E FIG.5F

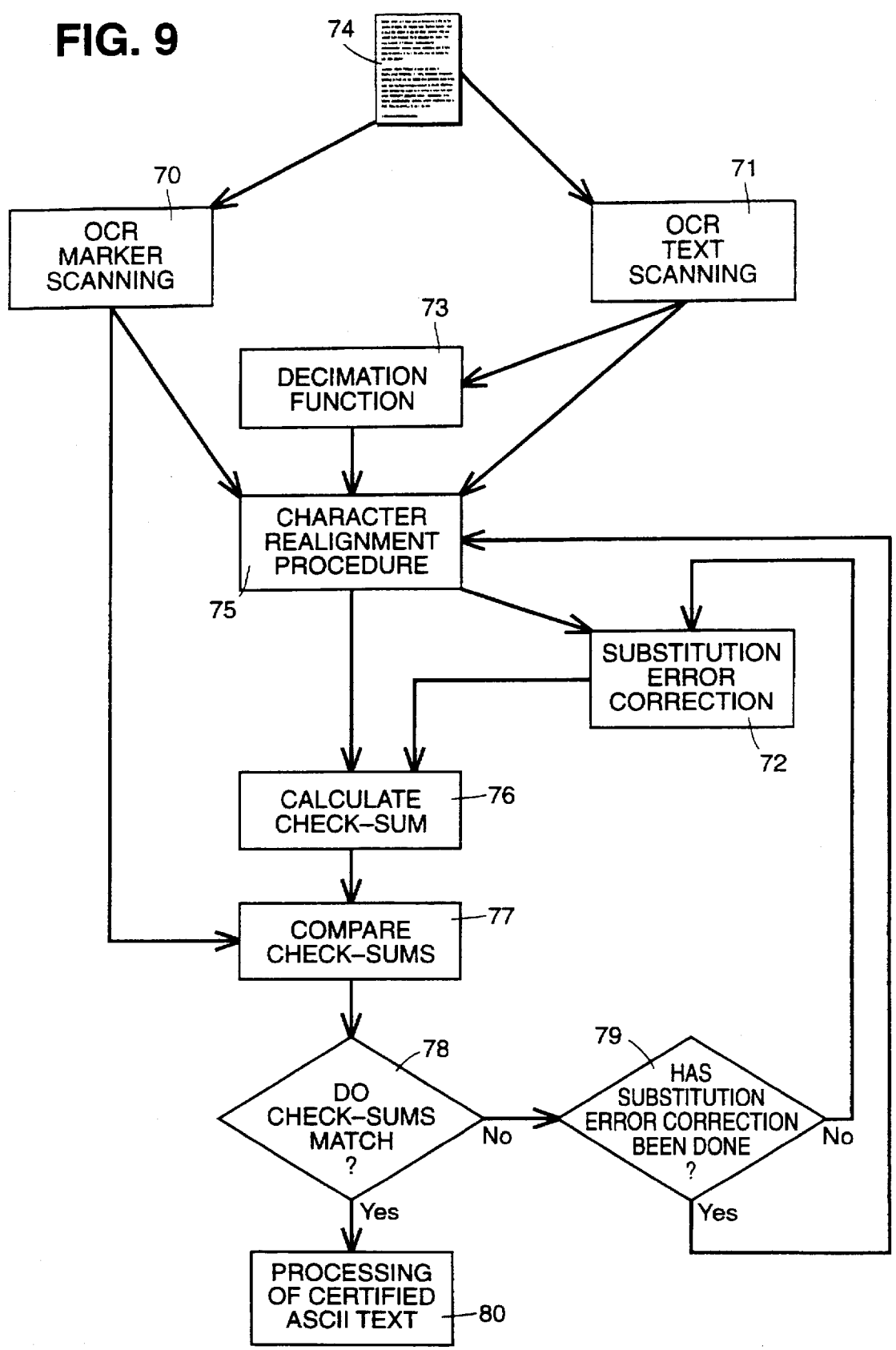

FIG. 10

|  | OCR Text | | | | | | | |
|---|---|---|---|---|---|---|---|---|
|  | Line 1 | Line 2 | Line 3 | Line 4 | Line 5 | Line 6 | Line 7 | Line 8 |
| Line 1 | 0 | 58 | 54 | 59 | 54 | 59 | 56 | 25 |
| Line 2 | 58 | 0 | 21 | 24 | 24 | 25 | 22 | 36 |
| Line 3 | 54 | 21 | 0 | 20 | 23 | 23 | 20 | 34 |
| Line 4 | 59 | 24 | 20 | 0 | 24 | 24 | 22 | 40 |
| Line 5 | 60 | 24 | 24 | 18 | 20 | 20 | 22 | 37 |
| Line 6 | 54 | 24 | 23 | 24 | 0 | 25 | 18 | 30 |
| Line 7 | 59 | 25 | 23 | 24 | 25 | 0 | 21 | 36 |
| Line 8 | 56 | 22 | 20 | 22 | 18 | 21 | 0 | 34 |

Original Text

METHOD AND MEANS FOR ENHANCING OPTICAL CHARACTER RECOGNITION OF PRINTED DOCUMENTS

This invention relates to the use of automatically generated document markers. This application is a continuation-in-part of application Ser. No. 07/958,938 filed on Oct. 9, 1992 now abandoned. More particularly, it relates to the use of markers of encoded information incorporated into each page of a document for providing a means for not only document identification and document structure recognition, but also error detection and error correction when the marked documents are reproduced using optical character recognition technology.

BACKGROUND OF THE INVENTION

The identification of products using computer readable bar codes, wherein digital data is recorded directly on paper, provides for item identification given a fixed set of values using simple numeric encoding and scanning technologies. Identification of computer generated and stored documents is another technology which has been developed using binary encoding to identify and provide for retrieval of stored documents. Most document-generating software programs provide not only identification and/or retrieval information for the document, but also include encoded information for provision to an associated printer specifying, for example, such details as spacing, margins and related layout information. Once the document has been printed on paper, however, that information no longer accompanies the document, other than as discerned by the user. If it is desired to reproduce the document using an optical character recognition (OCR) system, there is no automatic means by which to communicate the layout information through the scanner and to the receiving computer. A desirable extension of the identification technology would be, therefore, the provision of a means for generating a paper version of a document which can be recognized, reproduced and proofread by a computer by optically scanning a marker incorporated in or on the paper document in conjunction with the OCR text scanning of the document.

Document or product identification systems which have been employed in the past include bar code markers and scanners which have found use in a wide range of arenas. With respect to paper documents, special marks or patterns in the paper have been used to provide information to a related piece of equipment, for example the job control sheet for image processing as taught by Hikawa in U.S. Pat. No. 5,051,779. Similarly, identifying marks have been incorporated into forms as described in U.S. Pat. No. 5,060,980 of Johnson, et al. The Johnson, et al. system provides for the editing of forms which are already resident in the computer. A paper copy of the form is edited by the user and then scanned to provide insertions to the fields of the duplicate form that is stored electronically in the computer. Still another recently patented system is described in U.S. Pat. No. 5,091,966 of Bloomberg, et al., which teaches the decoding of glyph shape codes, which codes are digitally encoded data on paper. The identifying codes can be read by the computer and thereby facilitate computer handling of the document, such as identifying, retrieving and transmitting the document. The systems described in the art do not incorporate text error detection or correction schemes. Further, the systems require that the associated computer have a copy of the document of interest in its memory prior to the input of information via the scanning. The systems cannot be applied to documents which are being created in the scanning computer by OCR.

Optical character recognition systems, are illustrated schematically in FIG. 1, generally include a digitizing scanner, 16, and associated "scanning" computer, 18, for scanning a printed page, 14, which was generated by an originating computer, 12, and output by a printer, 13. The scanner, 16, extracts the text to be saved, as electronic document, 15, in a standard electronic format, such as ASCII. What is desirable is to additionally incorporate information about the text and layout for error detection and correction, which information can be optically scanned or otherwise automatically input.

Due to the inherent limitations in both the scanning process and the ability to an optical character recognition system to effect accurate character recognition, errors are introduced into the output, including not only character misinterpretation errors but also layout-dependent errors. The typical character misinterpretation errors which occur in the OCR reproduction of documents include the following: substitution errors, wherein erroneously-identified characters are substituted for the actual printed characters (e.g., "h" for "b", wherein "the bat" becomes "the hat"); deletion errors, wherein characters or spaces are erroneously omitted from the scanned region (e.g., "the bat" becomes "that"); and, insertion errors wherein characters or spaces are erroneously inserted into the reproduced region (e.g., "the bat" becomes "t, he b at"). In addition, a common error can, in fact, be a combination of these basic error types (e.g., reading "rn" for "m" involves a substitution and an insertion, while reading "H" for "fl" involves a substitution and a deletion). In addition, entire lines of text can be inserted or deleted in the course of OCR scanning and reproduction. Traditional error detection/correction schemes generally operate to detect and correct substitution errors but are ineffectual at detecting and correcting deletion and insertion errors of the kind encountered in OCR, as further discussed herein.

Post-processing, specifically error detection and correction, must then be performed, primarily by human proofreading of the reproduced document. Errors in layout are ordinarily not automatically rectifiable by the computer; but, rather, require extensive, user-intensive editing or possibly re-creation of the document. The human post-processing is expensive not only in terms of actual costs but also in the time needed to complete the processed document. Optimally, solutions will provide not only a means for detecting character substitution errors but also a means for detecting and correcting all of the character and line misinterpretation errors. Further, an ideal solution should additionally facilitate identification of the document itself and communicate the appropriate layout structure for the document.

Error detection/correction systems which have been employed in the computer document creation technology (e.g., word processing) include techniques based on dictionary lookup and/or attempts to use semantic, or context, information extracted from the document in order to identify and correct errors. Many of these systems require that entries in the document which do not correlate to an entry in the lexicon will be reviewed by a "human post-processor". The automated error correction version of a dictionary-based system will, upon identification, spontaneously correct entries which do not correlate to dictionary entries. One can readily envision a circumstance wherein automatic spelling correction is not desirable, such as in the case of a proper name, an intentional misspelling or a newly coined term. The presumption in the use of dictionary-comparison versions of such systems is that each entry in the entire document be compared to a data-base dictionary of terms. The cost of comparison of each entry of a document to a given lexicon is quite high. Streamlined error detection and location, without the need for entry-by-entry comparison, is desirable.

The use of semantic information extracted from the document is further proposed in the art in order to facilitate the identification and automatic correction of errors that have been detected but which cannot be readily identified as misspellings of available dictionary terms or which "resemble" more than one available dictionary entry. Such a system will recognize and correct the term "ofthe" to "of the" when a dictionary lookup would simply reject the term or miscorrect it. Similarly, a bank of commonly-occurring errors for the hardware or software being used, and for the font or fonts being scanned, has been proposed for use with the context, or semantic, information in order to identify and automatically correct common errors, such as "rn" being incorrectly identified as "m", or the letter "O" being incorrectly identified as the number "0".

To detect errors without requiring an entry-by-entry lookup, particularly for documents which are transmitted over extended networks, systems have made use of parity bits transmitted with the data. Once the transmission has been effected, a bit count is done on the "new" document. If the calculated bit matches the transmitted parity bit, then an error-free transmission is assumed. Such systems, and extensions of the parity and check bit concept, as taught in U.S. Pat. No. 5,068,854 of Chandran, et al., are useful for detecting errors in digitally encoded information. Further extensions of the parity bit concept, such as balanced weight error correcting codes, to detect and provide correction of more than a one-bit error are also found in the art, such as in U.S. Pat. No. 4,965,883 of Kirby. Parity and check bit systems developed for use with binary coded information are capable of ascertaining the presence of errors with reasonable accuracy given the low probability of the error bit of an erroneously-received quantity of data matching the check bit of the transmitted material. Since the bits are calculated on binary-encoded data, they are most effective for detecting one-bit errors; except as modified in the weighted balancing and random checking instances. Generally speaking, however, the check and parity bit systems tend to be data-independent methods for assuring error-free transmission of computer-to-computer transfers. The check and parity bit systems are not, therefore, considered thorough checking systems but merely first screening techniques which are intended for digital-to-digital communications and not obviously applicable to analog-to-digital conversions such as optical character recognition.

A further prior art system, providing a 16-bit check sequence which is data-dependent and calculated on the contents of the data field, is found in U.S. Pat. No. 4,964,127 of Calvignac, et al. Once again, the system is applied to data which is transmitted along a data path, presumably in digital format.

In the field of optical character recognition (OCR), there is a similar need to provide the means for detecting and correcting errors in data which has been reproduced from optical scanning, bit mapping and computer encoding. Both dictionary lookup and common-error reference have been proposed for use in the OCR context. However, as with the document creation needs of the past, the entry-by-entry checking is inefficient and not guaranteed to produce the correct result. Moreover, in addition to the printed words, the document layout is a critical feature in OCR. The use of current parity bit check systems in an optically-scanned, bit mapped system is only nominally effective for error detection, relatively ineffective for error location and totally ineffective for detection and correction of improper layout.

Apparatus for identifying and correcting "unrecognizable" characters in OCR machines is taught in U.S. Pat. No. 4,974,260 of Rudak. In that system, the characters which are not recognized, in the electronic dictionary lookup operation, are selectively displayed for an operator to effect interpretation and correction. More fully automated OCR error detection and correction is desirable, but not currently available.

U.S. Pat. No. 4,105,997 of McGinn, entitled "Method For Achieving Accurate Optical Character Reading of Printed Text" provides a basic error detection scheme for checking the accuracy of text reproduced using optical character recognition. The McGinn system calculates a check-sum value for each line of data using ASCII text, and prints the check-sum symbol or symbols at the end of each printed line of text in the document. Upon OCR scanning of the printed line, the printed check-sum symbol is also scanned and " . . . processed in a routine manner to produce an ASCII code serial bit stream . . . " Upon reproduction of the printed line, a check-sum value for the reproduced line of text is calculated and compared to the scanned symbol. If the two check-sums do not match, the existence of an error is assumed, the line is rescanned, and the process is repeated until a match is found, if ever. No intra-line error location can be realized by the McGinn system, nor can actual correction of a detected error be conducted short of rescanning and reproducing the line, if even then.

Since the McGinn system encodes the check-sum symbol using ASCII text, the symbol is optically scanned and recognized using the same technology as the standard text. Consequently, error-free location and recognition of the check-sum symbol cannot be guaranteed. The recognition system may not be able to distinguish the symbol from the line text. Moreover, the symbol may be erroneously identified. A difference between the scanned symbol and the calculated check-sum for the reproduced text may, therefore, be indicative of misinterpretation of the check-sum symbol even if accurate reproduction of the scanned text has been achieved. Another class of OCR reproduction errors which cannot be accounted for when using the McGinn system is the omission or insertion of entire text lines. Absent a corresponding scanned check-sum, the McGinn system can neither account for nor correct entire line errors. In effect, therefore, the McGinn system simply confirms the accuracy of text reproduced by OCR, as opposed to improving that accuracy.

It is therefore an objective of the present invention to provide a means and method for automatically incorporating information markers on a paper document, which information is encoded to provide a variety of detail about the document to an associated computer.

It is another objective of the invention to establish the absence or presence of errors on a page reproduced using OCR technology without requiring an entry-by-entry comparison.

It is another objective of the invention to provide an error detection system and method for precisely locating errors on a page reproduced using OCR technology.

It is still another objective of the invention to provide an error detection system which can be used in conjunction with existing error correction systems to precisely locate document errors and compensate for deletion and insertion errors before effecting substitution error correction procedures.

Another objective of the invention is to provide an automatic error correction means and method for documents reproduced using OCR technology.

It is yet another objective of the invention to provide an error detection system which can overlook intentional misspellings, abbreviations, etc.

It is a further objective of the invention to provide an error detection system which can be used with any document format, fonts, and related hardware.

It is yet another objective of the invention to provide a means for providing documents with unique markers which can be used to impart various information to computers.

Still another objective of the present invention is to provide a means and method for supplying documents with computer-readable markers which contain information about the document including document structure, error identification, location and correction information, and document identification and retrieval information.

SUMMARY OF THE INVENTION

These and other objectives are realized by a system which implements the creation and incorporation of a document marker for documents to be reproduced. The marker can include a variety of information including document structure and error detection encoding. The error detection/correction encoding information comprises a certificate, including at least one value calculated on the text and incorporated, by one of various encoding techniques, into the certificate of the marker provided on the face of the document to be reproduced. Upon OCR reproduction of the document, certificate values for the text, as the text appears on the reproduction, can be recalculated and then compared to the original certificate values. If the values match, the probability is that the reproduction is error-free. If the certificate values do not match, at least one error is present in the text as reproduced. The certificate can provide not only error detection, but also error location (for example, which character on a line is in error); and can include error correction codes or pointers to traditional dictionary lookup and semantic systems. Additional information can be encoded, with the calculated text certificates or as separate information in the machine readable markers, to provide information regarding the document layout, document identification, document location in the computer system, destinations of computers or other interconnected peripherals for transmission of the document, and such other information as may be required.

BRIEF DESCRIPTION OF THE DRAWINGS

The invention will now be described in greater detail with reference to the accompanying drawings wherein:

FIGS. 5A through 5F illustrate one scheme for encoding the layout of the complex document illustrated in FIG. 4.

FIG. 9 provides a representative flow chart of the processing steps performed by the certifying software when utilizing a certificate having the decimation, error correction code and check-sum information of the present invention encoded therein.

FIG. 10 illustrates a table of edit distance values for determining the correspondence of lines of OCR reproduced text to the original lines of text and locating any full-line deletions and insertions.

DETAILED DESCRIPTION OF THE PREFERRED EMBODIMENT

In accordance with the present invention, markers are created for paper documents which may contain data-dependent document information, including, but not limited to, a "certificate" encoding error detection and error correction information, and a document layout code, for communication to a "scanning" computer and use by the scanning computer upon reproduction of the document using OCR technology.

Figure 1:
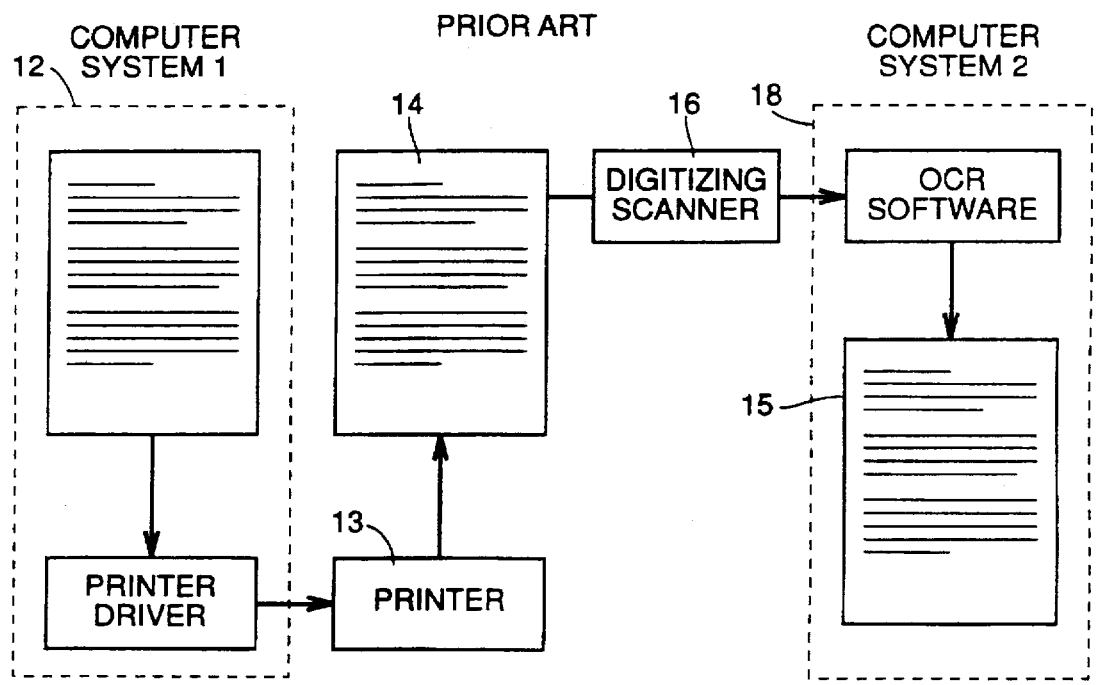
FIG. 1 schematically illustrates the prior art OCR method of scanning and reproducing a document.
Figure 3:
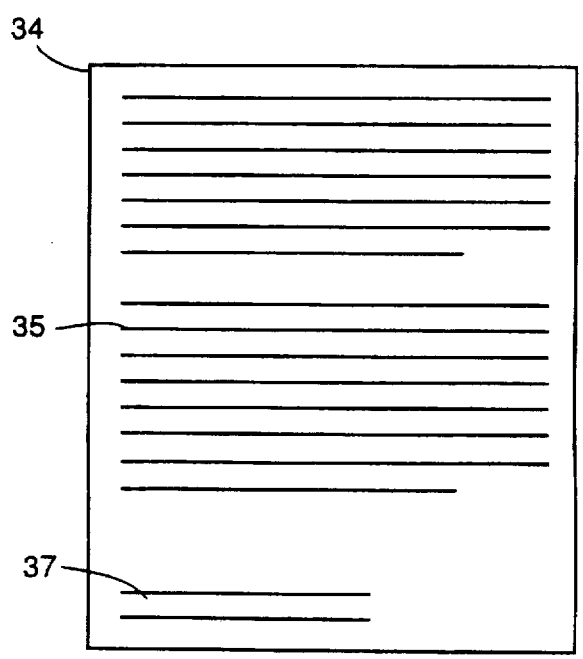
FIG. 3 illustrates a document generated in accordance with the present invention.
Figure 2:
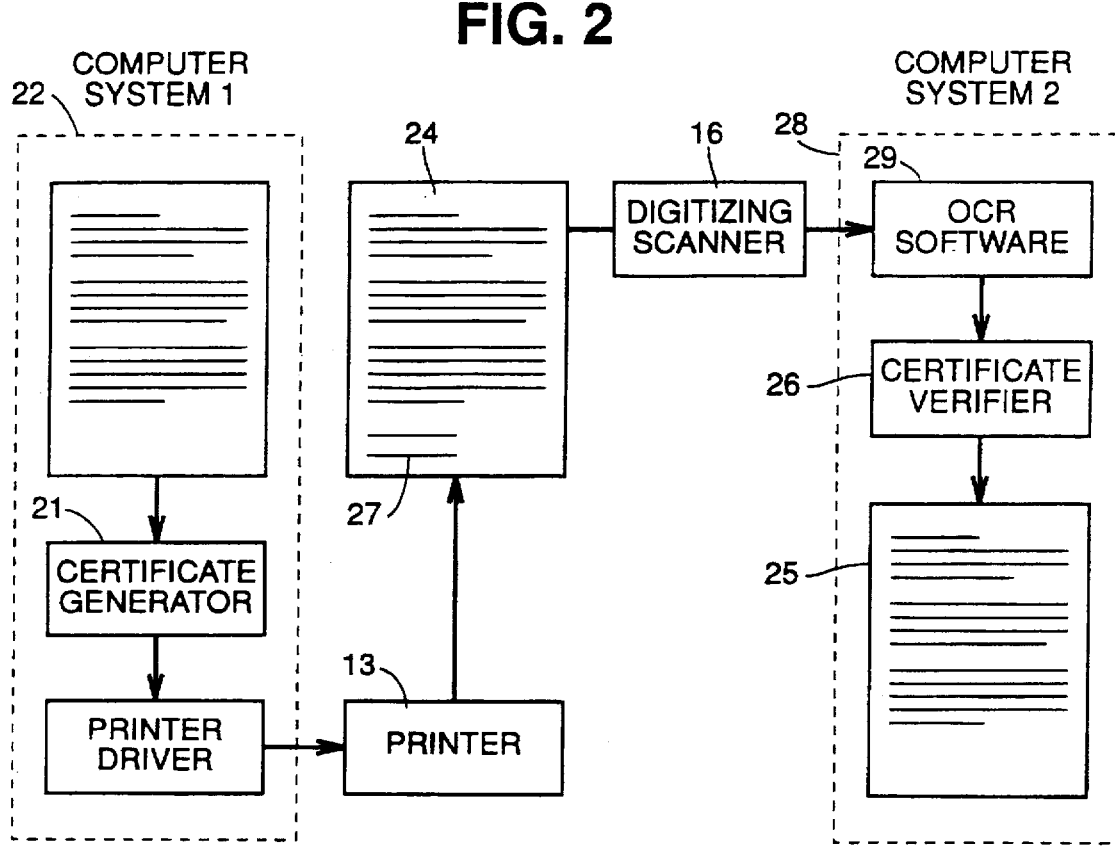
FIG. 2 schematically illustrates the OCR method for reproducing a document with markers having certificates to provide error detection and correction.

When creating the certificate component of a marker during the computer generation or preprocessing of an original document, the certificate generator 21 of the originating computer, 22 as illustrated in FIG. 2, calculates one or many data-dependent certificates, 27, with an appropriate algorithm, several examples of which are detailed below. A certificate is a succinct key encoding information about the contents of the page, produced upon generation of the document or at print time, and recognizable by the OCR software, 29, associated with the scanning computer, 28. Any document generated on a computer can have a marker including at least one certificate appended to or associated with each text block or page. The process of generating the marker requires no human intervention, and only a small added computational cost. As illustrated in FIG. 3, the document 34, as generated as a printed page or in another medium, is comprised of an area 35, formatted primarily for human use, and an area 37 formatted for machine use to assist the machine in its "understanding" of the so-called "human" area. The human area is the analog portion of the document and the machine area is the digital portion of the document. The distinction is used to designate the use made of the portions of the document rather than the specific embodiments. The two portions can, and preferably would be, printed using the same technology. As an example, the "digital" portion, i.e., the marker, can be printed using a special font, bar code or other symbology which may or may not be "readable" to the human user, but which is chosen to facilitate computer readability. The marker is intended to provide information to the OCR software so that it becomes possible to produce a perfectly transcribed digital copy of the original printed page.

The marker that is computed and printed on the page contains information about the contents of that page. The originating computer, 22 of FIG. 2, includes certifying software, 21, referred to as the certificate generator. Once the document has been created, or in the process of the creation thereof, the certifying software calculates one or more certificates based upon the information in and on the document. It is to be noted that certificate values for the original document need not have been assigned upon creation of the original document; but, can be created by preprocessing the original document through the certifying software prior to printing. The generated marker, including the one or more calculated certificates, 27, is produced as a machine readable part of the hardcopy, 24, of the document which is output by the printer, 13. As in the prior art, the hard copy to be reproduced is scanned using a digitizing scanner, 16, which is associated with a second computer, 28, equipped with the OCR software. The original marker, 27, is also optically scanned and saved by the scanning computer. After the OCR document has been created, the OCR software uses the same algorithm, as that used by the original printing software, to calculate one or more certificate values for the extracted text. The illustration provides the "certificate verifier", 26, as a separate part of the computer 28 and the "certificate generator", 21, as part of computer 22. As would be evident to one having skill in the art, the certificate generator or certificate verifier is incorporated into the overall system and need not be a separate program. In addition, the calculating of certificates for original or scanned data is not necessarily a separate process step, but may be conducted concurrently with the creating and/or saving of the data. Once calculated, the new certificate values may be compared to the original certificate values scanned from the printed page. If the new and the original certificate values match, the translation is deemed complete and presumed to be error free with high probability. If there is a mismatch, the OCR certificate verifier software can detect and correct a small number of errors, given its own or one or more of the known error correction schemes used by current document creation or OCR systems, as discussed above.

Figure 6:
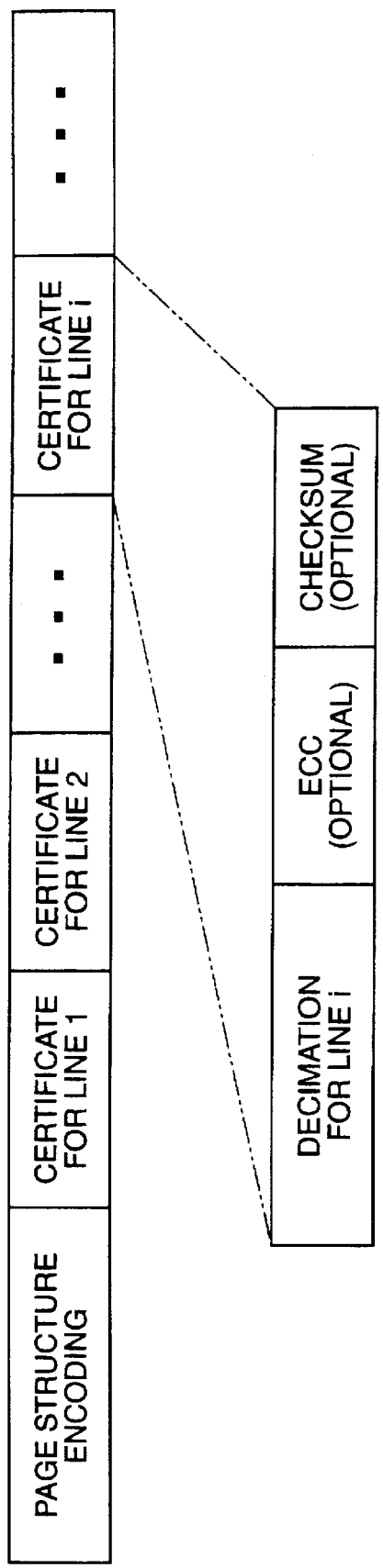
FIG. 6 schematically illustrates the contents of a document marker in accordance with the present invention.

As illustrated in FIG. 6, the document marker may include several kinds of encoded data-dependent document information, including the page structure encoding (i.e., document layout information) and one or more certificates for the text. The certificates may be calculated on a per line basis, as is illustrated, or may be calculated on a block of text, which block may encompass all or some portion of the page. Several methods of encoding the text for inclusion in the certificate, including the decimation function referenced in FIG. 6, are detailed below. In addition to the text decimation encoding for the line, the certificate may include an optional error correction code and an optional check-sum, either of which may also be utilized in ascertaining the accuracy of the reproduction and in correcting same. It is further to be noted that the certificate "components", e.g., the decimation string, the error correction codes and the check-sum, need not be calculated on the same amount of material on the page. As suggested by the drawing, the certificate may include encodings of all three values for each line, wherein generation of the certificate for a block of text would involve steps of calculating a decimation for the block of text, providing an error correcting code for the text (or a pointer telling the scanning computer to invoke certain known error correction lookup tables or the like), and providing a check-sum calculated on the block of text. As an alternative, the various certificate values may be calculated on different sized blocks of text, for example the decimation may be conducted for a line of text, while the check-sum could be calculated on a paragraph or on the entire page contents, or such other variation as is practicable and clearly envisioned by the present description and claims.

The error correction codes which may be incorporated into the certificate portion of the document markers may be chosen to address the typical misinterpretation errors which can be expected given the text, the print codes, fonts, etc. and the anticipated scanner technology. If particular errors, such as the standard font characterization errors mentioned in the background section of the application, are expected, those specific errors can be accounted for in the certificate for the given text. In the alternative, the certificate can include a pointer directing the scanning computer to the applicable error correction lookup tables resident therein. It is conceivable that the anticipated character misinterpretation errors for the available technology will be so numerous as to render the text uncorrectable-given a lack of similarity to expected characters and spacings. In such an instance, it would be most advantageous to encode the entirety of the text, or a compressed version thereof, in the certificate.

As mentioned above, the marker may be, and preferably is, provided on the face of the printed document using a technology other than standard printed characters. Given the problem at hand, the less than perfect ability of OCR to reproduce printed characters, a more highly machine-readable and reproducible technology such as barcode symbology is preferably employed when providing the marker on the surface of the document. Use of a more reliable symbology will not only promise more accurate interpretation of the symbol itself, but can also include internal error correction mechanisms for further insuring accurate reading of the marker. The scanning computer can be pre-programmed to locate the marker in a pre-determined location on the page, or can search each page it encounters for the document marker. It is not necessary that the marker be readable by, or even perceptible to, a human user of the document. The marker can, in fact, be provided in a symbology which is invisible on the face of the page, yet still perceptible to the scanner.

Once the marker has been discerned and decoded by the scanning machine, the certificate values can be used to verify the accuracy of the reproduced text. A first level of error detection is the decimation and re-alignment function, which can detect and correct insertion errors and can detect deletion errors and convert them into substitution errors, thereby generating at least one partially corrected candidate string of text, as will be further detailed below. After the decimation and re-alignment function, if error correction information has been encoded in the certificate, it may be invoked to address any substitution errors which may be found in a given re-aligned candidate. Further, either prior to, in lieu of, or after an iteration of substitution error correction has been completed, if a certificate check-sum is available, a check-sum for the corrected, reproduced text can be calculated and compared to the originally scanned check-sum for the relevant text block. If the certificate does not include any error correction codes, but does have a check-sum for the original text, a check-sum may be calculated for a re-aligned candidate sequence without conducting any error correction beyond that achieved by the decimation and re-alignment function. In either instance, successive candidate sequences can be tried if the initially generated one is not fully corrected. Clearly, the order of invoking the levels of comparison and correction is variable depending, upon the nature and frequency of expected errors, the availability of error correction codes and/or check-sum, and the costs (both in monetary and time constraint valuation) of each iteration.

As described in the aforementioned co-pending application, the check-sum can be computed in any of a number of ways. For example, the "C" subroutine shown below computes a simple check-sum on a line-by-line basis as follows:

```
#include <stdio.h>
#include <ctype.h>
#define MAXLEN 200 /*maximum input line length */
Main()     {
char line [MAXLEN],              /* input line */
      hash;          /* 8-bit hash value */
int   len,           /* length of input line */
      i;             /* counter */
      while (gets (line) != NULL)   { /* while more lines */
         len = strlen(line);         /* get length of input line */
      if (len > 0)                   /* if line is non-empty */
         hash = 0;                   /* initialize 8-bit hash */
         for (i = 0; i < len; i++){  /* *check each character */
            if (!isspace (line[i])){ /* if character is non-space */
               hash ^= line [i];     /* XOR ASCII value with hash */
               hash = (hash <<1) | ((hash >> 7) & 0x01); /* left-rotate hash */
            }
         }
      }
      printf("%,2x", hash & 0xff);   /* print hash value */
   }
}.
```

THE ASCII Value of each non-space character is exclusive-or'd with a running 8-bit check-sum. This check-sum is then bit-rotated one position to the left, and the process is repeated with the next character in sequence. In this case, the line "This is a test." would receive the check-sum "03" (expressed in hexadecimal notation), which would be printed on the page in question. If, in the process of scanning, the OCR software misread the line as "Thus is a test.", the calculated check-sum would be "73". Hence, the OCR software would detect the presence of an error by comparing the two check-sums (one newly computed on the reproduced text and one originally computed, printed and read from the printed certificate) and determining that they do not match. In using this sample system, the probability that two random lines of text would has to the same check-sum is 1 in 256. The eight-bit check-sum is only one example of a certificate value computation system. Those skilled in the art will readily recognize alternative computation methods which fall within the scope of the present invention. One having skill will additionally recognize that the size of the check-sum and the computation method can be varied to increase or decrease the probability of error detection as required by the specific application.

Another preferred text encoding scheme of the present invention, referred to above as the "decimation and re-alignment" function, can effectively detect and correct insertion errors and detect deletion errors converting them into substitution errors to be addressed in a subsequent error correction step. Due to the lack of correspondence between characters in the original and the reproduced versions of a document, deletions and insertions are not readily addressed by the known substitution algorithms which identify recognized character errors in an arbitrary data stream and then provide alternative character sequences for same. Substitution algorithms cannot account for or recognize the existence of insertions or deletions. The first phase, therefore, of the re-alignment function is to enforce correspondence between characters in the original and the reproduced data streams.

For the sentence having the original text character sequence:

"The quick brown fox jumped over the lazy dog.",
the following scanned line character sequence may be reproduced:

"The qUick br own fox jurnped over the lazydog."
Note that the OCR reproduced line is one character longer than the original line of text. This violates the alignment assumption underlying traditional error correcting codes. Furthermore, the Hamming distance between the two lines (i.e., the number of positions in which the two lines differ) is 35. Hence, even if the original line is augmented with an additional space or other character in order to equalize the lengths of the lines, a traditional error correcting code would have to be able to handle up to 35 substitution errors to correct the line, which is simply not feasible under the presently available technology.

The problem introduced by random insertions and/or deletions is the "sliding" of the original and the reproduced lines in relation to each other which increases the Hamming distance so that many more substitution errors arise. The decimation approach counteracts the effects of deletions and insertions by enforcing correspondence between the characters on the lines.

To identify deletions and insertions, the well-known concept of approximate string matching is employed. The relationship between two similar but not necessarily identical lines of text can be made mathematically precise using an edit model wherein the basic operations of deleting a character, inserting an arbitrary character and substitution one character for another are used. Each of these operations is assigned a cost, $c_{del}$, $c_{ins}$ and $c_{sub}$, and the minimum cost sequence of operations that transforms one string into the other is called the edit distance. The optimization of edit distance is realized using a well-known dynamic programming algorithm wherein $s_1, s_2 \ldots s_i$ the first i characters of the original line, and $t_1, t_2 \ldots t_j$ are the first j characters in the OCR reproduced line. Defining $d_{ij}$ to be the distance between the two substrings, the dynamic programming recurrence is:

$$d_{i,j} = \min \begin{cases} d_{i-1,j} + c_{del}(s_i) \\ d_{i,j-1} + c_{ins}(t_j) \\ d_{i-1,j-1} + c_{sub}(s_i,t_j) \end{cases}$$

Figure 7:
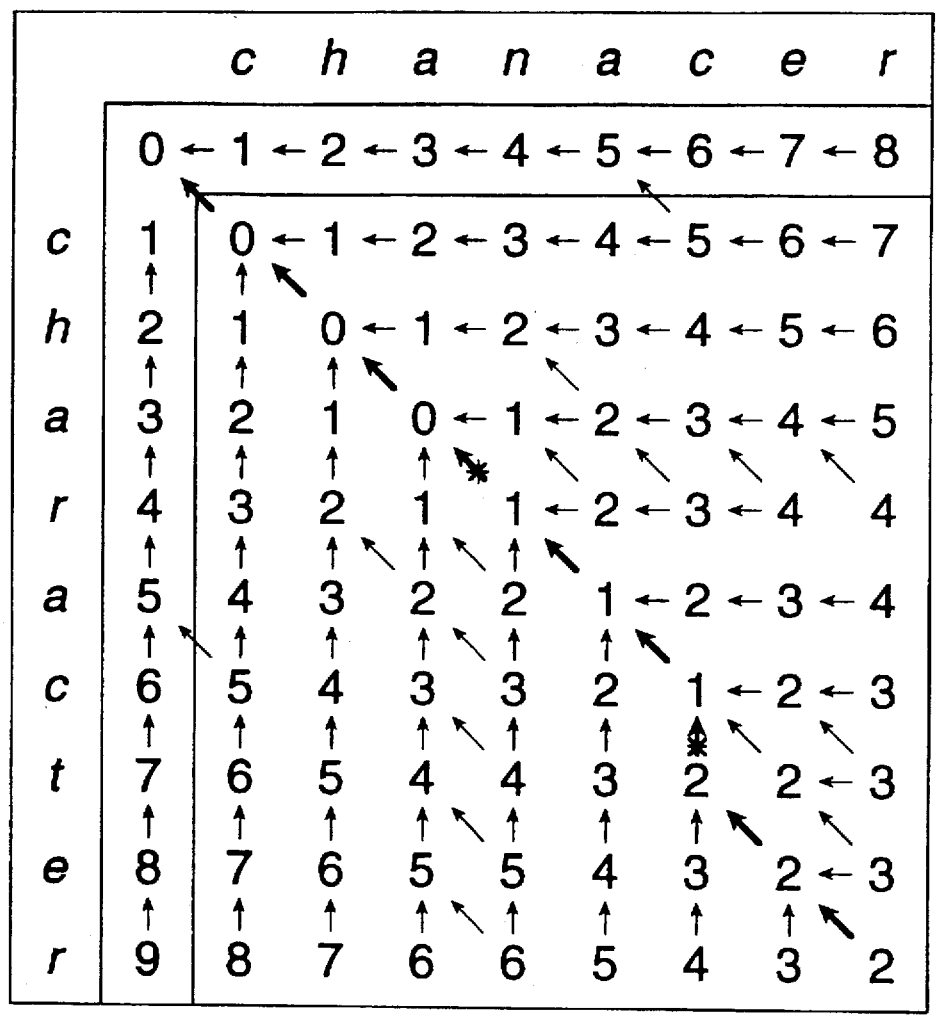
FIG. 7 illustrates a traceback table created by the edit distance function described herein.

In addition, if the choices which lead to the minimums (i.e., the optimal decisions calculated above) are mapped, the resulting traceback table provides the sequence of operations which will perform the transformation needed to align and edit, or correct, the reproduced string. FIG. 7 illustrates the combination edit distance/traceback table comparing the original word "character" to the erroneously reproduced word "chanacer". The sequence of bold-strike arrows leading from the lower right hand corner of the table to the upper left corner corresponds to the optimal editing path. The asterisked arrows indicate the location of a deletion (the letter "t") and a substitution (the letter "n" for "r").

Figure 8A:
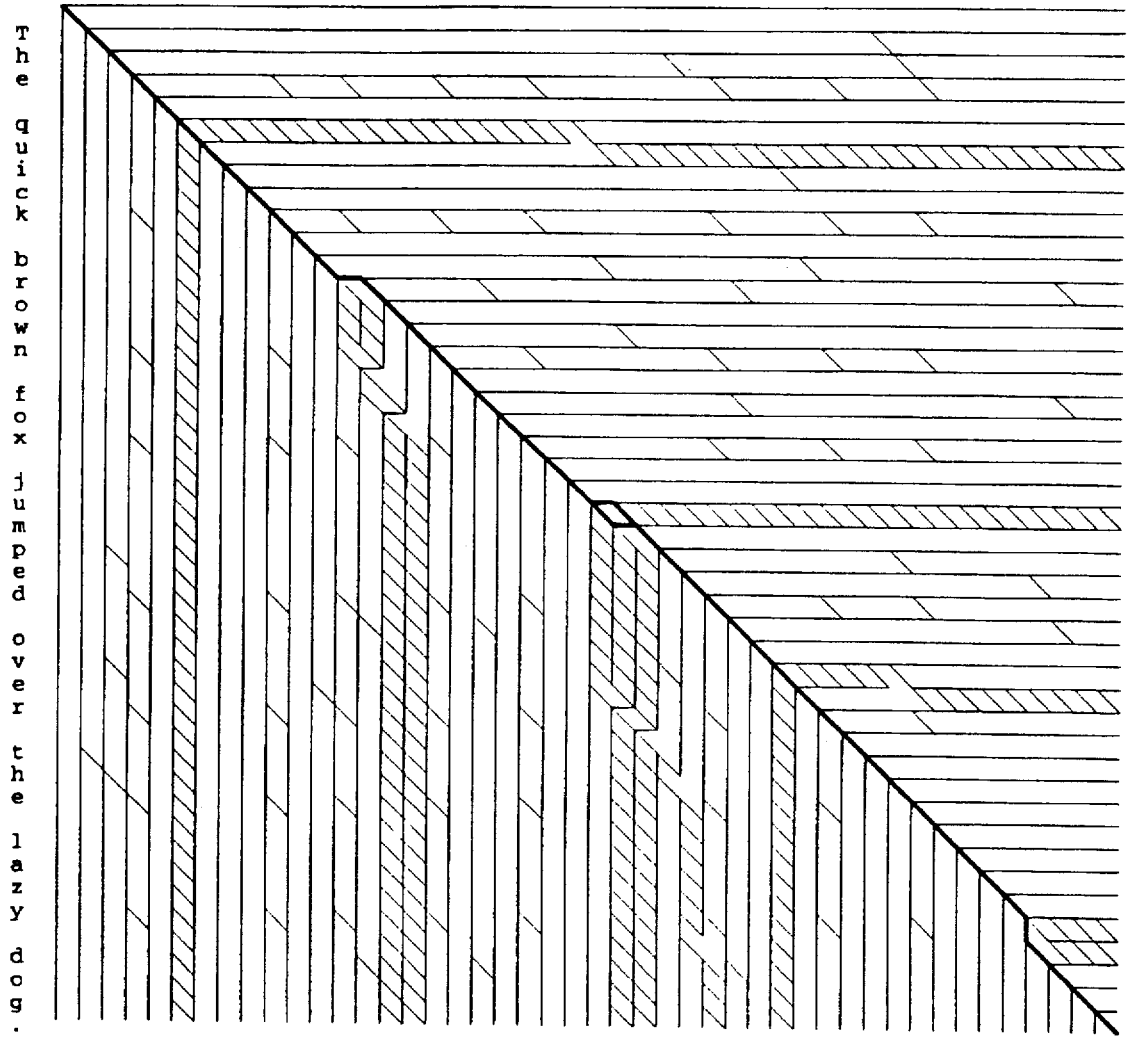
FIGS. 8A and 8B illustrate alignment of full text and decimated line sequences for a printed sentence and the OCR reproduction of same.

In general, there may be more than one optimal editing path through the table. FIG. 8A illustrates an alignment chart for the two sentences, or character sequences recited above. As can be seen, the correspondence between "m" and "rn" provides for two possible interpretations, depending upon which character is chosen for deletion and which for substitution.

Figure 8B:
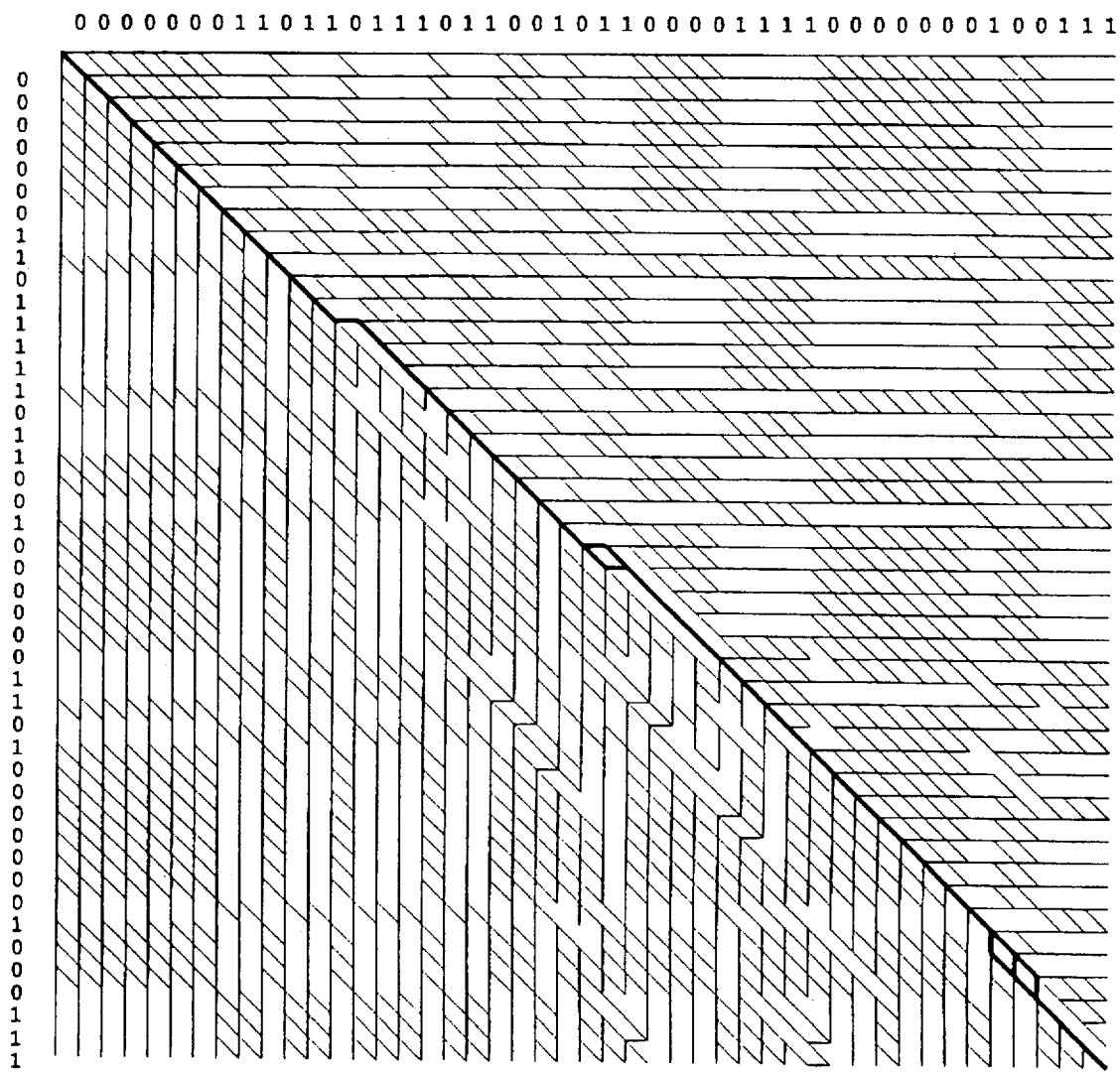

As an alternative, the original, or source, text is "decimated" whereby each character of the original text, including spaces, is mapped to a single bit in the certificate. In the context of ASCII encoding, which is fairly common to computer-generated documents, one bit of the ASCII representation of each character can be assigned to the certificate for that character. For example, one encoding scheme which has been reduced to practice utilizes the next-to-lowest order bit of the ASCII encoding for each character as the certificate value for that character. The decimation of the original text line printed above then becomes the following:

00000001101111101100100000011010000001000111.
The decimation value is incorporated into the certificate which is associated and printed on the page, with the original text line. Upon OCR reproduction of the line, the certifying software performs the same mapping of characters to bits. The resulting decimation of the scanned line character sequence printed above then would be as follows:

00000001101101110110010110000111100000000100111.
The certifying software then performs sequence alignment between the two decimated certificates to determine possible locations of deletions, insertions and even some substitutions. FIG. 8B illustrates an alignment chart, or traceback table, for the two decimated strings. In the alignment of the decimated strings, one region of uncertainty is broader than seen in a simple alignment of the actual character sequences. It is clear that the decimation alignment can recognize deletions and insertions and can at least partially identify some substitution errors.

The certifying software invokes a re-alignment algorithm for correcting the misaligned (i.e., erroneously reproduced) scanned line character sequence. As part of the re-alignment process, the algorithm will produce a number of partially corrected versions of the scanned line. For the scanned sentence provided above, several of the corrected candidates may include, among others, the following character sequences:

The qUick brown fox ju*ped ov*r the laz*ydog.
The qUick brown fox ju*ped ov*r the lazy*dog.
The qUick brown fox ju*ped ov*r the lazyd*og.

The Hamming distances between the original line and the candidate lines are 5, 4 and 5 respectively. Although the substitution error "U" for "u" was not detected for the line, due to the particular decimation function applied, the "rn" for "m" substitution was flagged, with one extra character being deleted and an asterisk substituted for the other, and the "c" for "e" substitution was flagged, with the erroneous character being replaced by an asterisk. The space added in "brown" was detected and deleted, while the space deleted between "lazy" and "dog" was identified and compensated for by inserting an asterisk. Since the re-alignment cannot precisely locate the latter-recited deletion, three possible candidates were generated.

What is clear from the re-aligned character sequences is that, in terms of line length and character correspondence, deletion and insertion errors have been compensated for by the re-alignment algorithm. Assuming only insertion errors, the re-alignment procedure could, therefore, result in a 100% corrected sequence. If a check-sum was provided in the marker, a check-sum for the corrected sequence can be calculated and compared to the original check-sum to indicate successful correction via re-alignment.

Should re-alignment fail to produce a fully corrected sequence, the other available value or values in the certificate for the text can be used. As noted, above, the re-alignment software will generate candidate strings each corresponding to one minimum-cost editing path through the dynamic programming traceback table. If the certificate additionally includes an optional check-sum for the original text, a check-sum for the re-aligned candidate sequence can be generated for comparison to the original. Obviously, if the check-sums do correlate, the assumption is that the re-aligned candidate sequence is "correct." If the certificate includes an error correction code for the original text, that error correction code can be applied to the re-aligned candidate sequence. The error correction code for the text is encoded to anticipate the expected OCR errors for the given character set. As such, substitution errors can be readily addressed and corrected by the accompanying error correction code.

Given a line for which the certificate contains decimation, error correction code and a check-sum, the check-sum calculation for the decimated, aligned and substituted sequence can be conducted and the resulting check-sum compared to the original check-sum. If the check-sums do not match, the re-alignment software produces another possible partially corrected candidate for substitution correction and check-sum calculation and comparison, and so forth until a corrected reproduction of the original sequence is produced. In the rare case that no corrected reproduction is produced, it may be necessary to flag the sequence for manual "post processing."

As discussed in the Background section, the error correction methods which are available for incorporation into an OCR system include dictionary lookup search strategies, semantic or context information codes and common error recognition codes, among others. Certificates can improve OCR recognition rates and provide a reliable method by which users can ascertain whether or not each scanned page is error free. As noted above, use of an error detection and correction system without knowing if intentional "errors" exist in a document can actually cause errors to be introduced into the text. When using a certificate system of error detection and correction, however, this can be avoided. In the instance of an intentional misspelling, for example, the certificate system would not indicate that an error had been made, and would not therefore erroneously correct the intentional misspelling.

FIG. 9 illustrates a representative process flow utilizing the decimation and re-alignment function, wherein the certificate includes not only the decimation encoding, but also error correction code and check-sum encoding. Printed page 74 is scanned, whereby two sequences of information are provided to the receiving/scanning computer, previously referred to as computer system 2. One sequence of information received by the scanning computer is the ASCII text (with errors) of the scanned line character sequence, at 71. The other sequence of information is the original certificate found in the document marker, for this example containing at least one original decimated sequence, at least one error correction code and at least one check-sum, scanned from the printed page, at 70. The certifying software applies the decimation function to the ASCII text of the scanned line character sequence, at 73, and provides the resulting decimated sequence for comparison to the original decimated sequence during the re-alignment procedure illustrated at 75. One of two alternative process paths may be followed upon completion of the first iteration of the re-alignment procedure. A candidate corrected sequence may be provided directly for check-sum calculation and comparison, illustrated by the line from the re-alignment procedure to box 76 at which the check-sum is calculated for the candidate sequence. The calculated check-sum is then compared, at 77, to the original check-sum, provided from by box 70. As indicated by decision box 78, if the check-sums match, the certified ASCII text is output, or otherwise processed as appropriate, at box 80.

If the check-sums do not match, the candidate sequence may be provided for substitution error correction at box 72, if the answer to the question "Has substitution error correction been done?", at decision box 79, is "No". An alternative path is to first conduct substitution error correction on the candidate sequence and either assume a fully corrected sequence or calculate the check-sum for the corrected candidate sequence and compare the calculated check-sum to the original check-sum. Should the check-sum for the corrected candidate sequence not match the original check-sum, and the substitution error correction already, necessarily, have been conducted for the given candidate, the process will return to the re-alignment step, 75, for processing of an alternative candidate sequence. As will be apparent to one having skill in the art, the exact progression and use of optional process steps can be altered and optimized without departing from the inventive content thereof.

The earlier-described difficulty of realizing and correcting line deletion and insertion errors can similarly be addressed using edit distance processing as illustrated in FIG. 10. FIG. 10 is a correspondence table comparing the original text lines and the OCR text lines. The comparison determines the edit distance between the decimation sequence of the original text characters and the decimation sequence of the OCR reproduced text for each line. If the lines align, the edit distance will be zero, as indicated by the "0's" located primarily along the diagonal, assuming that there are not OCR errors in the reproduced line. If OCR errors exist, the edit distance for two "correctly corresponding" lines will be relatively small, and low integers will be found along the diagonal of the correspondence table. The line correspondence software can be provided with a preset threshold value of "similarity" of lines given the known error correction capability of the available codes. However, the edit distance between an original and an OCR line that do not correspond will, in all probability, be quite large, as indicated by the larger integers away from the diagonal. When a high edit distance number is encountered, the line correspondence software will compare the relevant line of original text to another different line of OCR reproduced text and continue to do so until it finds a reasonably corresponding line, i.e., having a relatively low edit distance number.

The FIG. 10 table provides an illustration of the two major line errors which can be addressed using the edit distance, line correspondence function. As the edit distance is analyzed for line 5 of the original text, it is apparent from the absence of low integers that there is little correspondence between any of the OCR lines and line 5 of the original text. From this analysis, it is apparent that line 5 of the original text has been omitted from the OCR reproduced text. Examining the column corresponding to OCR line 8, it is also apparent from the lack of low integers, that few, if any, characters in the line of OCR reproduced text correspond to the characters of any line of the original text. The conclusion, therefore, is that line 8 of the OCR text has been erroneously inserted, since it does not correspond with any of the lines of the original text. No previous automatic document correcting scheme has been capable of providing this level of error correction.

As is evident from the foregoing, the line error correction procedure utilizes the character decimation certificate values. If line errors are to be expected, the FIG. 9 process flow would ideally include a line correspondence step prior to the character alignment performed at 75. Needless to say, if the OCR reproduced line is not correctly aligned to the original line, and therefore not being compared to a corresponding line of the original text, the subsequent character alignment cannot effectively be performed.

One important consideration, particularly in the case of documents with complicated structures, is determining the canonical parsing order for computing the certificate value. Obviously, the software that calculates the original certificate values and the OCR software must both use the same order. For layout encoding, one linearization formula may follow a left-to-right, top-to-bottom order in the same way that English text is normally read by humans. Another approach would be to decompose the page as a series of text blocks, each a separate entity in the calculation. Any blocks containing graphics or other non-text information must be handled differently than standard text. In the case of diagrams, recognition that a collection of "dots" corresponds to a perfect circle is a difficult task for image processing software. If, however, the certificate generator encodes the information that a given diagram contains 3 circles and a triangle, this information may greatly speed processing time and increase accuracy. Beyond encoding the existence of the diagram components, the precise locations and sizes of the basic geometric elements in the diagram could be encoded (e.g., circle radius 0.3 cm; x-coordinate 1.3 cm, y-coordinate 3.8 cm, etc.). It is further possible to adapt a certificate scheme to recognize mathematical equations or other special typeset structures.

Figure 4:
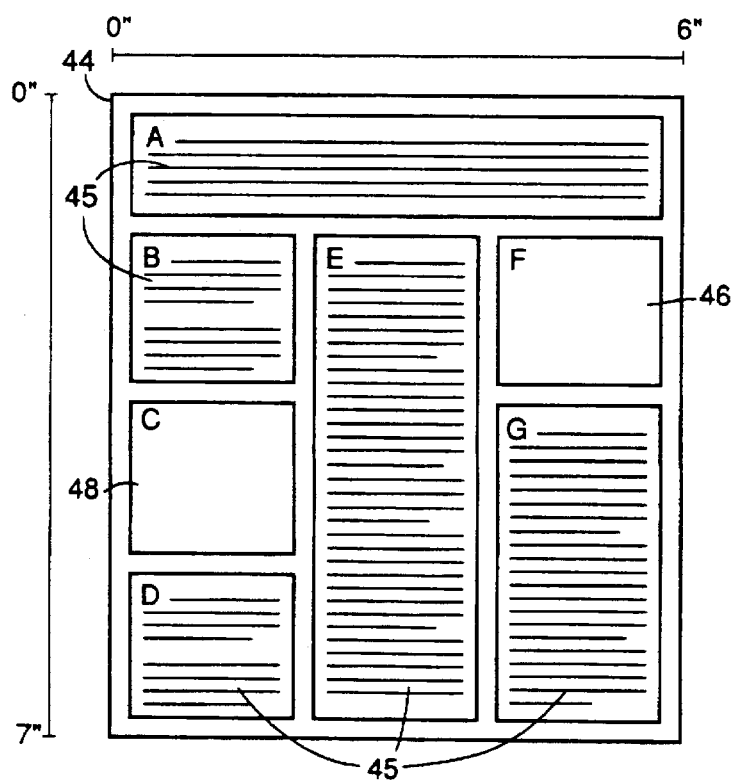
FIG. 4 illustrates a complex document containing diagrams, text blocks and photographs.
Figures 5A, 5B, 5C, 5D, 5E, 5F:
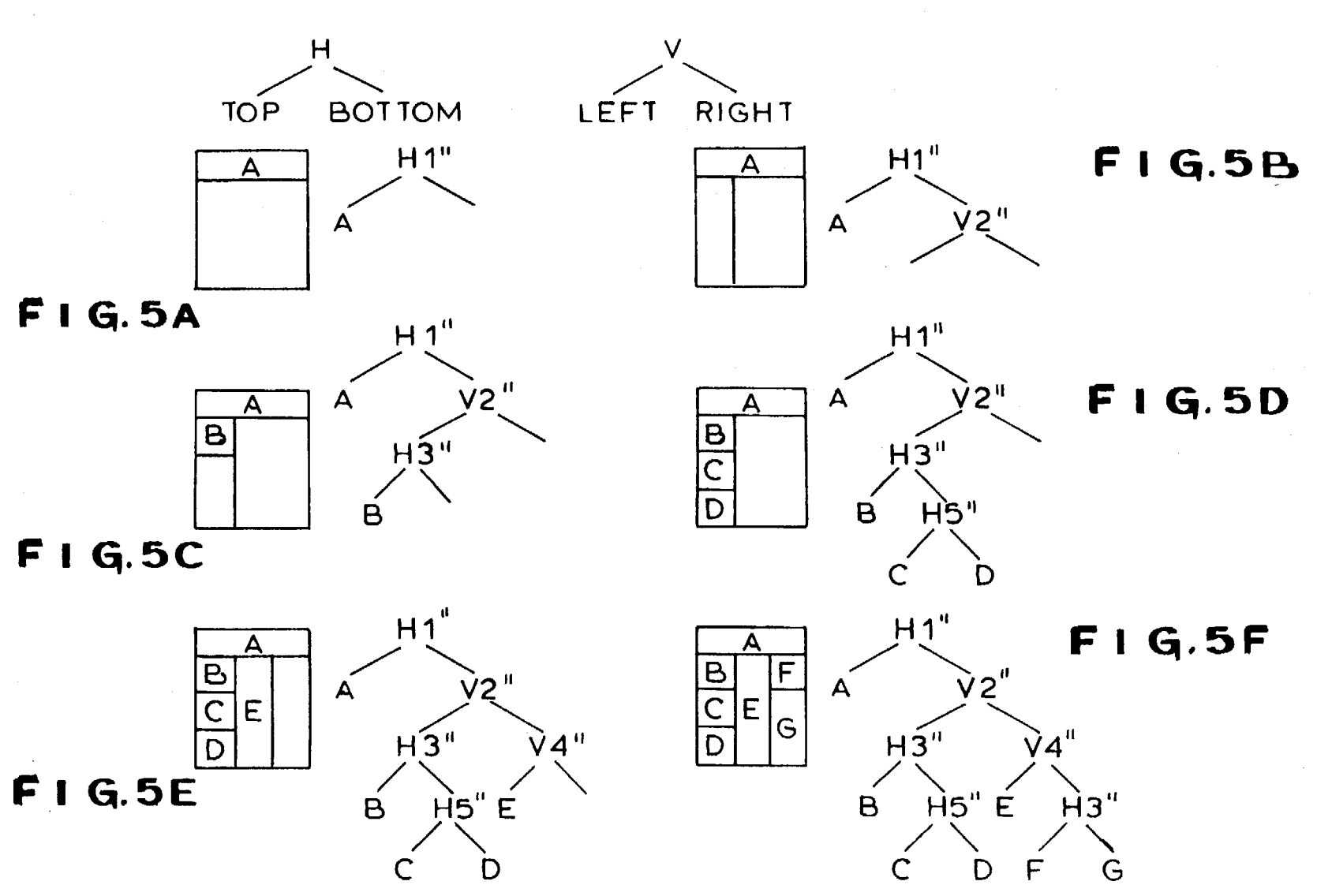

As noted with reference to FIG. 6, it is also desirable to incorporate the document structure information in a document marker. A 6" by 7" document having a complicated layout structure is illustrated in FIG. 4. The document, 44, contains text blocks A, B, D, E and G at 45, a photograph in block C at 48, and a diagram in block F at 46. In order to identify the document layout to the scanning system, one layout identification system which can be utilized is based upon a plane-slicing model, as is illustrated in FIGS. 5A through 5F. Other models can be utilized as appropriate. The plane-slicing model example presumes that the layout of a document, no matter how complicated, can be described by some number of cuts. The plane slicing can be represented recursively as a binary tree, provided the canonical ordering for the subplanes, represented by the leaves, has been defined. The slices or planes are first identified, and characterized as specific horizontal and vertical components, H and V, for example. Each slice is identified as a part of a tree structure. This tree structure is then encoded as a linear string. A recursive syntax is used to yield, for the illustrated document, the following:

$$(H1"CRT_A(V2"(H3"CRT_B(H5"PHT_C CRT_D))(V4"CRT_E (H3"FIG_F CRT_G));)$$

wherein each precise location is defined in inches, vertically or horizontally oriented; CRT represents the certificate calculated for the designated text block; PHT represents the photograph; and, FIG designates the diagram. This short string then completely describes the basic layout of the document. Within the string can be embedded additional information such as a description of the subplane contents (E.G., text, figure, equation, photo), precise x,y coordinates of the subplane on the page, and of course the error detection/correction certificate values.

To remain unobtrusive to the human reader, it is possible to "hide" the markers in, for example, a logo. A ¾×¾ inch logo can encode over 1,000 bits of information. Other embodiments may include using invisible inks or hiding the markers in the format of the document itself. It is not necessary that the information be provided apart from the human readable portion of the document, for example in a blank margin. What is necessary is that the information be provided in such a manner that the computer can readily ascertain its location and easily read the encoded information; and that it not interfere with the human readable portion in such a manner as to render it unreadable.

Since the markers are being described in terms of OCR use, it has been assumed thus far that the medium for reading the marker is a digitizing scanner. With the development of other input media, the encoding schemes will require adaptation to accommodate the relevant system. As with all of the preceding discussion, such modifications as would occur to one having skill in the art may be made without departing from the spirit and scope of the appended claims wherein:

What is claimed is:

1. A method for permitting machine-represented characters of a machine-represented document to be more accurately recovered when scanning a printed version of said document, comprising the steps of:

assigning a first binary value to each of a plurality of original machine-represented characters in said document;

printing said first binary values in machine-readable symbology and human recognizable characters corresponding to said original machine-represented characters in a printed version of said document;

scanning said printed version to recover machine-represented characters corresponding to said printed human-recognizable characters and to recover said first binary values;

assigning a second binary value to each of said recovered machine-represented characters; and comparing said recovered first binary values to said second binary values to identify errors in said recovered machine-represented characters.

2. The method of claim 1 further comprising the step of locating an error in respective ones of said recovered machine-represented characters based on detecting a difference between said recovered first binary values and said second binary values corresponding to respective ones of said recovered machine-represented characters.

3. The method of claim 2 further comprising the step of automatically correcting said located errors.

4. The method of claim 3 wherein said step of correcting comprises realigning said plurality of second binary values to said plurality of recovered first binary values to eliminate said errors.

5. The method of claim 4 wherein said step of correcting comprises altering said recovered machine-represented characters to generate intermediate characters adapted to be corrected to more accurately recover said original machine-represented characters.

6. The method claim 5 further comprising applying said encoded error correction information to perform at least one of error detection or correction on said intermediate characters.

7. The method of claim 1 wherein said step of assigning further comprises assigning at least one data-dependent value to said original machine-represented characters and said printing further comprises printing said data-dependent value in said printed version.

8. The method of claim 7 wherein said assigning of said data-dependent value comprises encoding error correction information for said original machine-represented characters.

9. The method of claim 7 wherein said assigning of said data-dependent value comprises calculating at least one first check-sum for said original machine-represented characters.

10. The method of claim 7 wherein said assigning of said data-dependent value comprises calculating at least one first check-sum for said original machine-represented characters, and said method further comprises the steps of:

calculating a second check-sum for said intermediate characters;

comparing said first check-sum to said second check-sum; and detecting the existence of at least one error in said intermediate characters when said check-sums differ.

11. The method of claim 1 wherein said step of comparing identifies insertion errors.

12. The method of claim 1 wherein said step of comparing identifies deletion errors.

13. A method for producing more accurate optical character recognition reproductions of documents having lines of original printed text and at least one document marker including a plurality of first decimation sequences, each corresponding to a sequence of said printed text, and at least one first check-sum value calculated on said sequence of printed text, comprising the steps of:

creating an electronic document comprising a plurality of first reproduced text sequences by optically scanning said original printed text;

optically scanning said at least one document marker;

decoding said plurality of first decimation sequences from said scanned document marker;

decimating said reproduced text into a plurality of second decimation sequences;

calculating the edit distances between corresponding lines of original printed text and reproduced printed text by comparing said first and said second decimation sequences;

comparing the edit distances and identifying line insertion and deletion errors in said reproduced text when said edit distances differ by more than a predetermined amount;

correcting detected line insertion and deletion errors;

comparing each of said corresponding plurality of first and second decimation sequences;

identifying text errors in said reproduced text at the sequence location at which said decimation sequences differ;

substituting different characters in said sequence locations at which text errors have been identified to produce at least one second reproduced text sequence;

calculating a second check-sum for each of said at least one second reproduced text sequences;

comparing said second check-sum to said first check-sum; and verifying the accuracy of said second reproduced text sequence when said first and said second check-sums are equal.

14. The method of claim 13 wherein said document marker further comprises a plurality of error correction codes for said original text and further comprising the step of applying said corresponding error correction code to said at least one second reproduced text sequence prior to calculating said second check-sum for said text.

* * * * *